US012571506B2

(12) United States Patent
Nykerk

(10) Patent No.: US 12,571,506 B2
(45) Date of Patent: Mar. 10, 2026

(54) MULTI-FUNCTION LIGHT PIPE

(71) Applicant: Flex-N-Gate Advanced Product Development, LLC, Windsor (CA)

(72) Inventor: Todd Nykerk, Holland, MI (US)

(73) Assignee: Flex-N-Gate Advanced Product Development, LLC, Windsor (CA)

( * ) Notice: Subject to any disclaimer, the term of this patent is extended or adjusted under 35 U.S.C. 154(b) by 0 days.

(21) Appl. No.: 19/043,986

(22) Filed: Feb. 3, 2025

(65) Prior Publication Data

US 2025/0257852 A1 Aug. 14, 2025

Related U.S. Application Data

(60) Provisional application No. 63/551,351, filed on Feb. 8, 2024.

(51) Int. Cl.

| | |
|---|---|
| ***F21K 9/61*** | (2016.01) |
| ***F21K 9/65*** | (2016.01) |
| ***F21K 9/66*** | (2016.01) |
| ***F21K 9/69*** | (2016.01) |
| *F21Y 103/10* | (2016.01) |
| *F21Y 105/10* | (2016.01) |
| *F21Y 115/10* | (2016.01) |

(52) U.S. Cl.

CPC .................. *F21K 9/61* (2016.08); *F21K 9/65* (2016.08); *F21K 9/66* (2016.08); *F21K 9/69* (2016.08); *F21Y 2103/10* (2016.08); *F21Y 2105/10* (2016.08); *F21Y 2115/10* (2016.08)

(58) Field of Classification Search

CPC ..... F21K 9/61; F21K 9/65; F21K 9/66; F21K 9/69

See application file for complete search history.

(56) References Cited

U.S. PATENT DOCUMENTS 7,086,765 B2 8/2006 Wehner
7,341,365 B2 3/2008 Basile et al.
(Continued)

FOREIGN PATENT DOCUMENTS

JP 2010262770 A 11/2010
WO 2024004279 A1 1/2024

OTHER PUBLICATIONS

Extended European Search Report dated Jul. 7, 2025, issued in EP Application No. 25156540.4, 10 pages.

*Primary Examiner* — Christopher E Dunay
(74) *Attorney, Agent, or Firm* — Avek IP, LLC

(57) ABSTRACT

This disclosure describes a light pipe apparatus which comprises several elements: a first light source, at least one optical sheet positioned above the first light source, a first mask comprising inverted images positioned above the optical sheet, a second light source, at least one clear diffusion sheet, a second mask comprising a slot positioned above the second mask, and a light pipe. Light in the form of an image from the first mask illuminates and passes through the clear diffusion sheet. An edge of the clear diffusion sheet is aligned with the second light source. The second mask is aligned with the faces of the clear diffusion sheet and positioned between the clear diffusion sheet and the light pipe. Each of the first light source and the second light source may be monochromatic or vary in color. Parameters such as timing, intensity, pulsing, oscillation, etc. may be independently controlled.

15 Claims, 7 Drawing Sheets

(56) References Cited

U.S. PATENT DOCUMENTS

| | | | | |
|---|---|---|---|---|
| 7,400,439 | B2 | 7/2008 | Holman | |
| 7,446,938 | B2 | 11/2008 | Miyatake et al. | |
| 8,687,149 | B2 | 4/2014 | Bell et al. | |
| 9,448,353 | B2 | 9/2016 | Holman et al. | |
| 9,772,085 | B2 | 9/2017 | Dubosc | |
| 9,884,992 | B2 | 2/2018 | Choi et al. | |
| 10,443,790 | B2 | 10/2019 | George et al. | |
| 11,506,359 | B2 | 11/2022 | Nykerk | |
| 2015/0062490 | A1 | 3/2015 | Kwon | |
| 2017/0059136 | A1 | 3/2017 | Annerino et al. | |
| 2017/0357040 | A1* | 12/2017 | Liu | F21S 43/245 |
| 2018/0267362 | A1* | 9/2018 | Gahagan | G02F 1/133512 |
| 2019/0005872 | A1* | 1/2019 | Newton | G02B 27/30 |
| 2019/0196088 | A1 | 6/2019 | Sim et al. | |
| 2020/0025354 | A1 | 1/2020 | Nykerk et al. | |
| 2020/0326044 | A1* | 10/2020 | Haenen | H05B 47/155 |
| 2021/0199872 | A1* | 7/2021 | Brick | G02B 6/0068 |
| 2022/0010942 | A1* | 1/2022 | Cornelissen | F21V 5/007 |
| 2023/0185012 | A1 | 6/2023 | Gourlay et al. | |
| 2023/0375151 | A1* | 11/2023 | Lee | F21S 43/26 |
| 2023/0400622 | A1 | 12/2023 | Robinson et al. | |
| 2024/0302004 | A1* | 9/2024 | Sato | F21K 9/64 |

* cited by examiner

MULTI-FUNCTION LIGHT PIPE

CROSS-REFERENCE TO RELATED APPLICATIONS

This application claims the benefit of priority of U.S. Provisional Patent Application No. 63/551,351, entitled Multi-Function Light Pipe and filed on Feb. 8, 2024, the disclosure of which is herein incorporated by reference in its entirety.

BACKGROUND OF THE INVENTION

1. Field

The disclosed embodiments relate generally to the field of light assemblies. More specifically, the disclosed embodiments relate to providing light pipe illumination with varying patterns, colors, and images.

2. Description of the Related Art

Many different types of lighting assemblies having a light pipe have been described in the prior art. For example, U.S. Pat. No. 11,506,359 to Nykerk describes lamp assemblies with illuminated light pipes. U.S. Pat. No. 10,443,790 to George et al. discloses a light pipe assembly with a LED light source at one end. The pipe has a surface with an emitting portion and an overlay portion, along with a reflective secondary surface. U.S. Pat. No. 9,772,085 to Dubosc discloses an optical light emission system for vehicles comprised of two lighting subsystems with a light guide for mixing and homogenizing the two light sources. U.S. Pat. No. 7,341,365 to Basile et al. discloses an LED unit for a vehicle lamp assembly having a housing, LEDs, a light pipe, and an optic structure. The optic structure is used to scatter light in a series of directions distal to the housing. U.S. Pat. No. 7,086,765 to Wehner discloses an LED lamp assembly with an array of LEDs that emit light onto a reflector, and the reflector reflects the light into a light beam. A light pipe is positioned in front of the reflector and receives light from a separate LED at its end.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In certain embodiments, a light pipe apparatus, includes: a first light source; at least one optical sheet positioned above the first light source; a first mask positioned above the at least one optical sheet; a clear diffusion sheet positioned above the first mask and aligned coplanar with the first mask; a second light source configured to illuminate an edge of the clear diffusion sheet such that the clear diffusion sheet is edge lit by the second light source; a second mask positioned above and coplanar with the clear diffusion sheet, wherein the second mask includes a longitudinal slot for light to pass through; and a light pipe positioned above the second mask and aligned with the longitudinal slot such that light passing through the longitudinal slot impinges on at least a portion of the light pipe for projection from the light pipe.

In certain embodiments, the first light source includes an array of light emitting elements.

In certain embodiments, the first mask includes portions that substantially block light emitted from the at least one optical sheet, and the first mask includes other portions that substantially permit emitted light to pass through for forming a pattern of emitted light.

In certain embodiments, the first mask includes partially translucent portions that permit some but not all light to pass through.

In certain embodiments, the first mask includes an opaqueness for substantially blocking light and a plurality of holes for forming a pattern, wherein the pattern of holes enables light to pass through.

In certain embodiments, the pattern of holes shapes a corresponding image of light projected from the light pipe.

In certain embodiments, the second mask includes an opaqueness for substantially blocking light.

In certain embodiments, the longitudinal slot of the second mask includes an opening that substantially spans a length of the clear diffusion sheet and the light pipe.

In certain embodiments, a method of projecting light from a light pipe apparatus includes: emitting light from a first light source, wherein the light from the first light source passes through at least one optical sheet positioned above the first light source; filtering light from the at least one optical sheet via a first mask positioned above the at least one optical sheet; emitting light from a second light source, wherein the second light source is positioned to illuminate an edge of a clear diffusion sheet positioned above the first mask and aligned coplanar with the first mask, such that the clear diffusion sheet is edge lit by the second light source; filtering light from the clear diffusion sheet via a second mask positioned above and coplanar with the clear diffusion sheet, wherein the second mask includes a longitudinal slot for light to pass through; and projecting light from a light pipe positioned above the second mask and aligned with the longitudinal slot, wherein light passing through the longitudinal slot impinges on at least a portion of the light pipe.

In certain embodiments, emitting light from a first light source includes emitting light from an array of light emitting elements.

In certain embodiments, filtering light from the first mask includes substantially blocking portions of light emitted from the at least one optical sheet, and substantially permitting other portions of emitted light to pass through, thereby forming a pattern of emitted light.

In certain embodiments, filtering light from the first mask includes permitting some but not all light to pass through partially translucent portions of the first mask.

In certain embodiments, the first mask includes a pattern of holes for forming the pattern of emitted light such that a corresponding image of light is projected from the light pipe.

In certain embodiments, the second mask includes an opaqueness for substantially blocking light such that light passes only through the longitudinal slot of the second mask.

In certain embodiments, the longitudinal slot of the second mask includes and an opening that substantially spans a length of the light pipe such that light is substantially projected along the length of the light pipe.

BRIEF DESCRIPTION OF SEVERAL VIEWS OF THE DRAWINGS

Illustrative embodiments are described in detail below with reference to the attached drawing figures, which are incorporated by reference herein and wherein.

Figure 1:
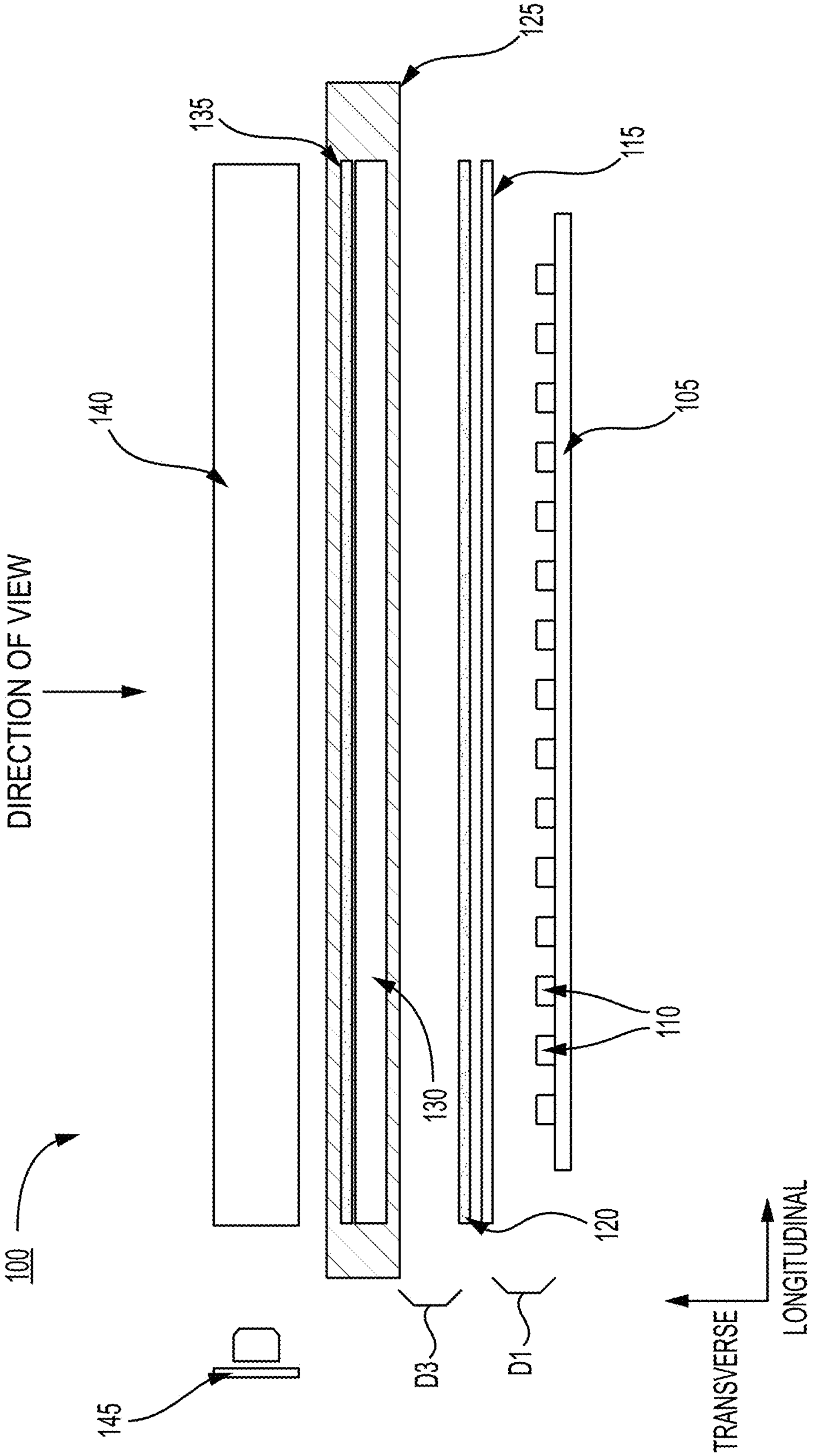
FIG. 1 shows a schematic of a light assembly according to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

It must be noted that as used herein and, in the claims, the singular forms "a," "an" and "the" include plural referents unless the context clearly dictates otherwise. Thus, for example, reference to "a layer" includes two or more layers, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Where the modifier "about" or "approximately" is used, the stated quantity can vary by up to 10%.

The term "horizontal" as used herein will be understood to be defined as a plane parallel to the plane or surface of the substrate, regardless of the orientation of the substrate. The term "vertical" will refer to a direction perpendicular to the horizontal as previously defined. Terms such as "above", "below", "bottom", "top", "side" (e.g. sidewall), "higher", "lower", "upper", "over", and "under", are defined with respect to the horizontal plane. The term "on" means there is direct contact between the elements. The term "above" will allow for intervening elements.

As used herein, the terms "first," "second," and other ordinals will be understood to provide differentiation only, rather than imposing any specific spatial or temporal order.

As used herein, the term "substantially" generally refers to ±5% of a stated value.

This disclosure describes a lit light pipe apparatus which comprises several integral elements: a first light source, at least one optical sheet positioned above the first light source, a first mask comprising inverted images positioned above the optical sheet, a second light source, at least one clear diffusion sheet positioned above the second light source, a second mask comprising a slot positioned above the clear diffusion sheet, and a light pipe. In a variation, an optional third light source is positioned to illuminate the light pipe along an axis of the light pipe. Light in the form of an image from the first mask illuminates and passes through the clear diffusion sheet. An edge of the clear diffusion sheet is aligned with the second light source. Each clear diffusion sheet emits a homogeneous light through the face of the sheet. The light sources typically consist of an LED array. The second mask is aligned with the faces of the clear diffusion sheet and positioned between the clear diffusion sheet and the light pipe. The second mask, a flat, opaque sheet features a clear slot area through which the altered light shines when illuminated. The geometry of the light pipe inverts the image so that the image is properly oriented when viewed by an observer. Each of the first light source, second light source, and third light source may be monochromatic or may vary in color. Parameters such as timing, intensity, pulsing, oscillation, etc. of each of the light sources may be independently controlled.

FIG. 1 shows a side view of an exemplary light pipe apparatus 100. Light pipe apparatus 100 comprises a first light source. The first light source is typically a printed circuit board (PCB) 105 upon which are mounted a number of light emitting elements 110. The light emitting elements are typically light emitting diodes (LED). Light emitting elements other than LEDs may be used and still fall within the scope of the claimed subject matter. In some embodiments, the light emitting elements are programmable to emit different colors. Examples of the light emitting elements are discussed in U.S. Pat. No. 11,506,359, issued to the present Assignee and is herein incorporated by reference for all purposes. The light emitting elements may be arranged in a linear array, a two-dimensional matrix, or other configurations.

At least one optical sheet 115 is positioned above the first light source. The distance D1 between the first light source and the optical sheet 115 may be in the range between about 1 mm and about 50 mm. In some embodiments, the distance is about 25 mm. The at least one optical sheet 115 is for example an optically clear plastic sheet having an array of light modifying elements (e.g., lenticular lenses) on one or both sides. The lenticular pattern is an array of light-modifying elements, such as an array of convex lenses that focus light according to a particular prescription. The lenticular pattern may be aligned in a particular direction throughout a respective sheet. The array of light modifying elements may be imprinted or molded on the sheet in a pattern. Depending on the size, shape, and focal length of the individual light modifying elements, as well as their collective pattern on the sheet, the at least one optical sheet 115 may be used to shape light from the light source in various ways. For example, light may be shifted, magnified, smoothed, collimated, homogenized, etc. In some embodiments, the array of light modifying elements are formed on both sides of the optical sheet(s). Examples of the optical sheets are discussed in U.S. Pat. No. 11,002,987, issued to the present Assignee and herein incorporated by reference for all purposes.

Altered light from the at least one optical sheet impinges upon a first mask 120. First mask 120 filters light by blocking portions of light emitted from the at least one optical sheet, while permitting other portions of emitted light to pass through, thereby forming a pattern of emitted light. First mask 120 may be opaque or partially translucent (e.g., semi-opaque), or first mask 120 may have both opaque portions and partially translucent portions in addition to openings that permit light to pass unhindered. In some embodiments, first mask 120 has a dark color for substantially blocking light and a plurality of holes or patterns of openings for enabling light to shine through and form a corresponding image. Examples of openings configured to form corresponding images include but are not limited to comprise circles, ovals, squares, rectangles, triangles, text, numbers, symbols, logos, icons, etc. Those skilled in the art will understand that other image patterns may be used and still fall within the scope of the claimed subject matter. Examples of the first mask are discussed in U.S. Pat. No. 10,753,579, issued to the present Assignee and herein incorporated by reference for all purposes.

Light pipe apparatus 100 further comprises a second light source. The second light source is typically a printed circuit board (PCB) 125 upon which are mounted a number of light emitting elements (not shown). The light emitting elements are typically light emitting diodes (LED). Light emitting elements other than LEDs may be used and still fall within the scope of the claimed subject matter. In some embodiments, the light emitting elements are programmable to emit different colors. Examples of the light emitting elements are discussed in U.S. Pat. No. 11,506,359, issued to the present Assignee and herein incorporated by reference for all purposes. The light emitting elements may be arranged in a linear array, a two-dimensional matrix, or other configurations.

Light pipe apparatus 100 comprises at least one clear diffusion sheet 130 positioned above and coplanar with first mask 120 by a distance D3. The distance D3 between the clear diffusion sheet 130 and the first mask 120 may be in the range between about 5 mm and about 20 mm. FIG. 1 illustrates a light pipe apparatus 100 comprising one clear diffusion sheet. Those having skill in the art will understand that any number of clear diffusion sheets may be used and still fall within the scope of the claimed subject matter. The thickness of the clear diffusion sheets may range from about 0.05 inches to about 0.75 inches. In some embodiments, the thickness of the clear diffusion sheets is about 0.125 inches. The clear diffusion sheet 130 illustrated in FIG. 1 is shown "edge-on". That is, an edge of the sheet is projected out of the plane of the page.

Figure 7:
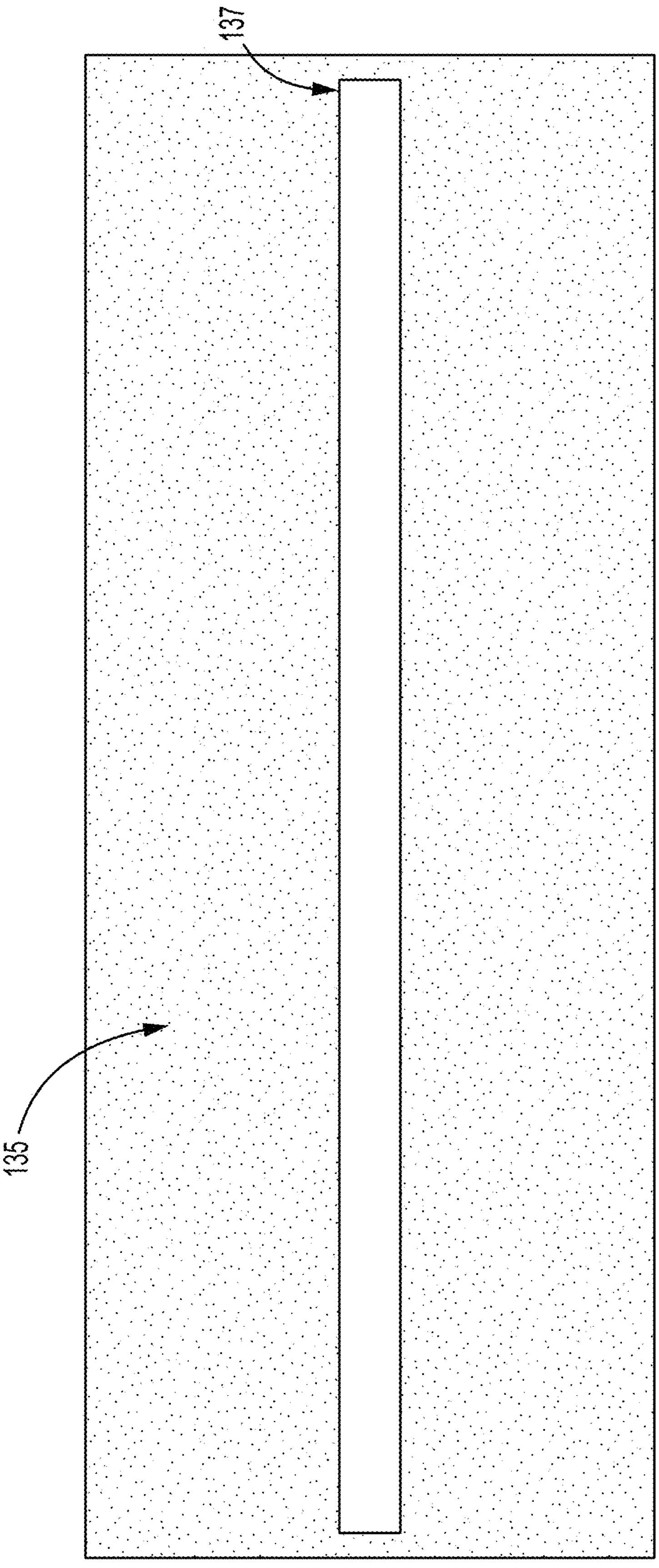
FIG. 7 shows a top view of a second mask having a slot, in an embodiment.

Light pipe apparatus 100 comprises a second mask 135 aligned and coplanar with a façade of the clear diffusion sheet 130 and situated between clear diffusion sheets 130 and a light pipe 140. Second mask 135 has opaqueness (e.g., is formed from an opaque material or is coated with an opaque coating) and has a slot that is aligned longitudinally along with the light pipe 140 and that spans the entire length of the clear diffusion sheets and the light pipe 140. FIG. 7 shows second mask 135 with a slot 137, in an embodiment. Slot 137 may have a width from about 1 mm and 10 mm. In some embodiments, slot 137 has a substantially rectangular shape. However, slot 137 may have other general shapes such as oval, circular, an arc, etc. Slot 137 is configured for light to pass through the second mask 135 towards light pipe 140. In other words, slot 137 is configured such that the second mask 135 filters light received from the façade of the clear diffusion sheet.

Light pipe 140 is for example an elongated optical member, such as cylindrical rods made of an optically clear plastic, e.g., polycarbonate (PC) or poly(methyl methacrylate) (PMMA). A cross-sectional shape of light pipe 140 may be cylindrical or oval. Light coming from the lit light pipe will have an apparent width and can be reduced. The size reduction depends upon the size of the light pipe 140 and the distance between light pipe 140 and the second mask 135. The light pipe apparatus 100 is viewed from the top of the page as indicated in FIG. 1.

In a variation of light pipe apparatus 100, an optional third light source 145 can be used to illuminate light pipe 140 along an axis of the light pipe as is well known in the art. The third light source is typically one or more LEDs. Light sources other than LEDs may be used and still fall within the scope of the claimed subject matter. In some embodiments, the light emitting elements are programmable to emit different colors. The remaining components in this variation are the same and operate in the same manner as described previously. The third light source is operable to modulate the overall brightness of the lit light pipe apparatus.

Figure 2:
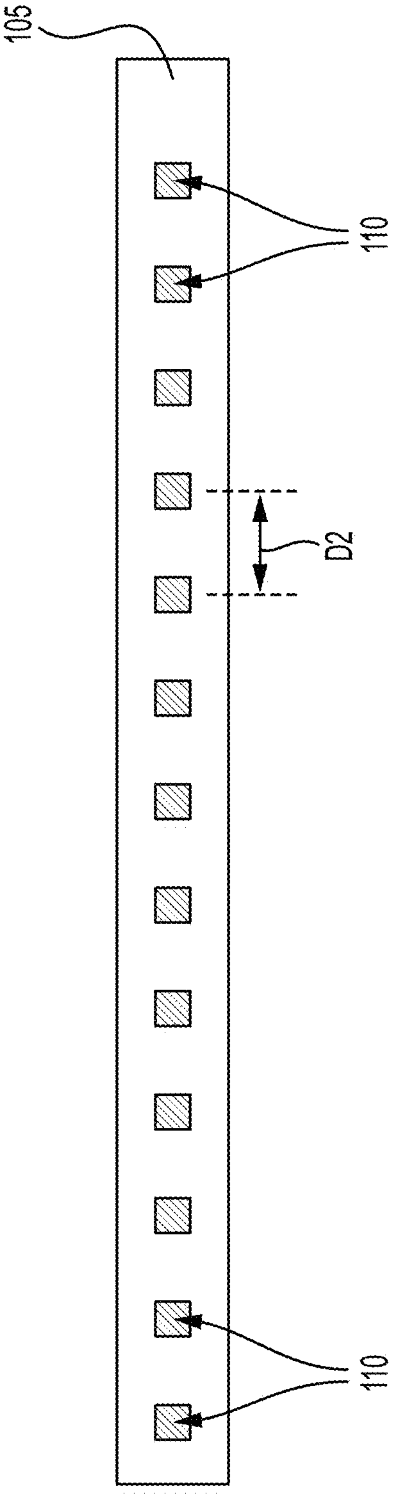
FIG. 2 shows a schematic of an array of light sources according to some embodiments.

FIG. 2 is a top-down view of first light source comprising PCB 105 having the plurality of light emitting elements 110 mounted thereto in a single linear array. Not all light emitting elements are labeled in FIG. 2 for clarity of illustration. The plurality of light emitting elements 110 are configured to provide an array of light emitting elements (e.g., a linear array of LEDs) aligned along a longitudinal direction and arranged in a linear pattern. Each array may have light emitting elements of the same color or the color along the array may change. The plurality of light emitting elements 110 are mounted on PCB 105 and spaced a predetermined distance apart from one another, such as the distance labeled "D2" in FIG. 2. In some embodiments, the plurality of light emitting elements 110 are arranged equidistant from one another on PCB 105 (i.e., each of the light emitting elements is a distance D2 apart from one another).

The second light source will have a similar configuration comprising PCB 125 having the plurality of light emitting elements (not shown) mounted thereto in a single linear array. The plurality of light emitting elements (not shown) are configured to provide an array of light emitting elements (e.g., a linear array of LEDs) aligned along a longitudinal direction and arranged in a linear pattern. Each array may have light emitting elements of the same color or the color along the array may change. The plurality of light emitting elements are mounted on PCB 125 and spaced a predetermined distance apart from one another, such as the distance labeled "D2" in FIG. 2. The "D2" distance may be the same or may vary between the first light source and the second light source. In some embodiments, the plurality of light emitting elements are arranged equidistant from one another on PCB 125 (i.e., each of the light emitting elements is a distance D2 apart from one another). Each of the clear diffusion sheets 130 discussed above will have an array of light emitting elements (e.g. a second light source) aligned along its bottom edge to edge-light the clear diffusion sheet. The timing sequence of the light emitting elements may be varied such that the light emitted is steady, pulsed, oscillates, or varies along the length of the array.

Figure 3:
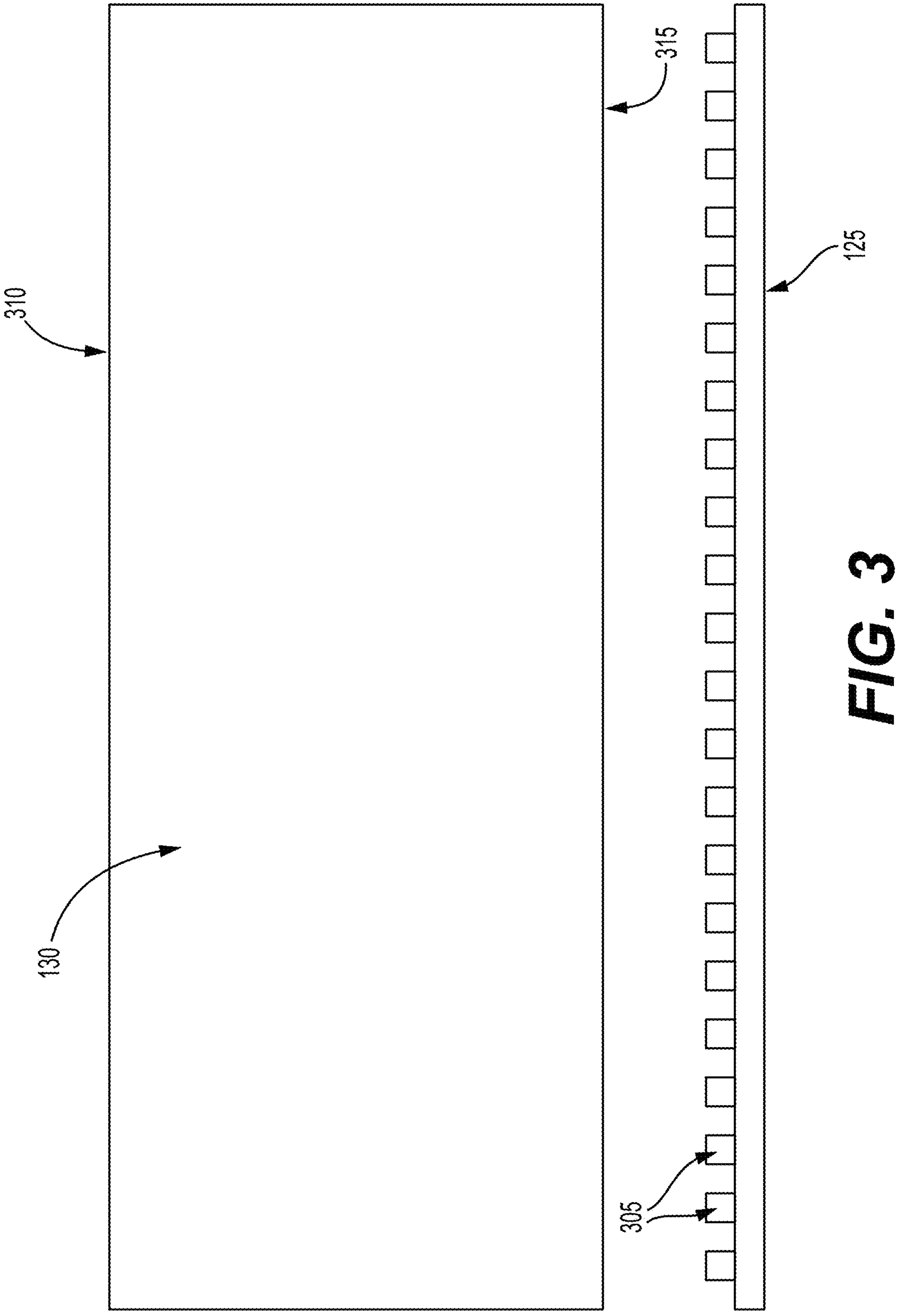
FIG. 3 shows a schematic of an array of light sources according to some embodiments.

FIG. 3 is a side view of PCB 125 having the plurality of light emitting elements 305 mounted thereto in a single linear array and one of the clear diffusion sheets 130 positioned above the array of light emitting elements. Not all light emitting elements are labeled in FIG. 3 for clarity of illustration. The clear diffusion sheet 130 has a "top" edge 310 and a "bottom" edge 315. Light emitted from the plurality of light emitting elements 305 enters the bottom edge 315 of clear diffusion sheet 130 and homogeneous light is emitted from the clear diffusion sheet through a face of the clear diffusion sheet that is in the plane of the page. That is, homogeneous light is emitted in directions out of the page.

Figure 4:
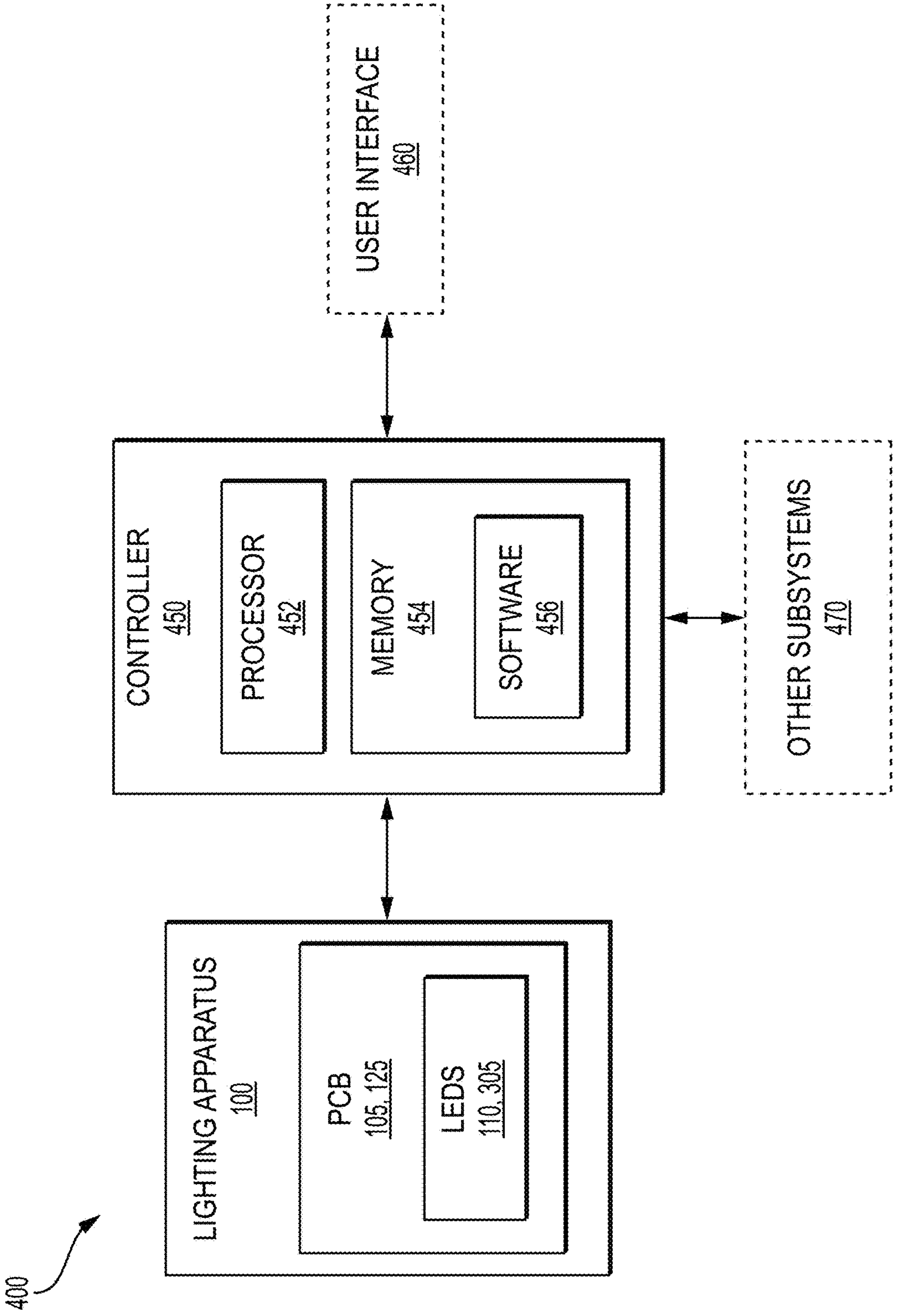
FIG. 4 shows a schematic of a light apparatus control scheme according to some embodiments.

FIG. 4 is a block diagram showing components of an exemplary control system 400 for controlling light pipe apparatus 100. Control system 400 includes a controller 450, which is for example a computer, microcontroller, microprocessor, or programmable logic controller (PLC) having a memory 454, including a non-transitory medium for storing software 456, and a processor 452 for executing instructions of software 456. An optional user interface 460 enables a user to transmit instructions and receive information, as further described below. The controller 450 is not limited by the materials from which it is formed or the processing mechanisms employed therein and, as such, may be implemented via semiconductor(s) and/or transistors (e.g., electronic integrated circuits (ICs)), and so forth.

In certain embodiments, user interface 460 includes a user input device, which may include one or more buttons or switches located in a vehicle cabin or on a handheld device (e.g., a key fob) for controlling the light pipe apparatus 100. In some embodiments, user interface 460 includes a touch screen display device configured for receiving touch indications by the user. The touch screen display device may be located in the vehicle cabin and/or accessed remotely via a mobile device (e.g., smartphone, tablet, or laptop computer). User interface 460 may be configured to present a menu for selecting various patterns via the plurality of light sources employed in light pipe apparatus 100.

Control system 400 of FIG. 4 enables light pipe apparatus 100 to provide custom appearances (e.g., stylistic features or lighting). In certain embodiments, controller 450 is optionally coupled communicatively with other subsystems 470. For example, controller 450 may be programmed with instructions for controlling the various light sources in coordination with other subsystems 470. This enables automatic control of the light pipe apparatus 100 based on input signals provided by other subsystems.

Communication between user interface 460, controller 450, other subsystems 470, and the light pipe apparatus 100 may be by a wired and/or wireless communication media. For example, controller 450 may include a transmitter/receiver, a multi-channel input/output (I/O) data bus, or the like (not shown) for communicatively coupling with user interface 460 and PCBs 105 and/or 125 of light pipe apparatus 100. The controller 450 is programmed with instructions for sending signals to the PCBs 105 and/or 125 for switching first and second light sources on/off or for dimming the first and second light sources via for example pulse-width modulation (PWM). Other electronics known to those of skill in the art may be used in conjunction with the controller 450 for controlling light sources and providing PWM without departing from the scope hereof. The programmed instructions may be predetermined and/or responsive to inputs from the user interface 460 or other subsystems 470. For example, programmed instructions may be used to dynamically illuminate the plurality of light sources in a variety of predetermined or random patterns, which may be configured for producing custom or variable stylistic or decorative features including lighting effects having different colors (e.g., via control of differently colored LEDs) and animated lighting effects.

Some methods of projecting light from light pipe apparatus 100 involve individually activating the first and second light sources. The third light source can also be activated if it is present. Light from the first light source illuminates and is altered by optical sheet 115. Altered light from optical sheet 115 passes through the images formed in first mask 120 as discussed previously. Optical sheet 115 ensures that the images in the first mask 120 are uniformly lit. The images will thus be projected upward on the page in FIG. 1 toward the observer. Because of the geometry of light pipe 140, the images will be inverted. Therefore, the images formed in the first mask should be inverted when formed so that they are properly displayed in light pipe 140. As discussed previously, the first light source may be formed from light emitting elements of the same color or may be formed from light emitting elements of different colors. The control system discussed in FIG. 4 may be used to vary the characteristics of the first light source. For example, all the light emitting elements may be set to the same intensity or the intensity may vary along the length of the array. Further, all the light emitting elements may be set to the same color or the color may vary along the length of the array. The timing sequence of the light emitting elements may be varied such that the light emitted is steady, pulsed, oscillates, or varies along the length of the array. This allows the images generated by light pipe apparatus 100 to have a wide variety of interesting effects.

Concurrently, light from the second light source enters the bottom edge of the clear diffusion sheet 130 and homogeneous light is emitted from the clear diffusion sheet 130 through a face of the clear diffusion sheet 130. Light in the form of the lit images filtered from the first mask 120 also passes through the face of the clear diffusion sheet 130 and onto the second mask 135. Light emitted from the face of the diffusion sheet is filtered through slot 137 in second mask 135 and illuminates light pipe 140. As discussed previously, the second light source may be formed from light emitting elements of the same color or may be formed from light emitting elements of different colors. The control system discussed in FIG. 4 may be used to vary the characteristics of the second light source. For example, all the light emitting elements may be set to the same intensity or the intensity may vary along the length of the array. Further, all the light emitting elements may be set to the same color or the color may vary along the length of the array. The timing sequence of the light emitting elements may be varied such that the light emitted is steady, pulsed, oscillates, or varies along the length of the array.

The control system discussed in FIG. 4 may be used to vary the characteristics of the optional third light source. Characteristics such as intensity, color, and timing may be used to vary the light input from the optional third light source.

During operation of light pipe apparatus 100, light emitted by the face of clear diffusion sheet 130 passes through slot 137 in second mask 135. The convex shape of the light pipe's outer surface (e.g. facing the observer) defines a focal point for the light pipe. Any images are inverted by the light pipe. Since the source image was previously inverted, the image appears correctly to the observer. Properly selected parameters such as the focal point of the light pipe, the distance between the light pipe and the second mask, and the width of the slot permits the light emitted through the slot to fill the diameter of the light pipe. From the perspective of the observer, this would correspond to a maximum width of the lit light pipe.

Some operations of light pipe apparatus 100 involve activating only one of the first light source or the second light source. The third light source can also be activated if it is present. In the variation where the first light source is activated, light from the first light source illuminates and is altered by optical sheet 115. Altered light from optical sheet 115 passes through the images formed in first mask 120 as discussed previously. Optical sheet 115 ensures that the images in the first mask 120 are uniformly lit by smoothing out any hot spots from the array of lighting elements. The images will thus be projected upward on the page in FIG. 1 toward the observer. Because of the geometry of light pipe 140, the images will be inverted. Therefore, the images formed in the first mask should be inverted when formed so that they are properly displayed in light pipe 140. As discussed previously, the first light source may be formed from light emitting elements of the same color or may be formed from light emitting elements of different colors. The control system discussed in FIG. 4 may be used to vary the characteristics of the first light source. For example, all the light emitting elements may be set to the same intensity or the intensity may vary along the length of the array. Further, all the light emitting elements may be set to the same color or the color may vary along the length of the array. The timing sequence of the light emitting elements may be varied such that the light emitted is steady, pulsed, oscillates, or varies along the length of the array. This allows the images generated by light pipe apparatus 100 to have a wide variety of interesting effects. The optional third light source may also be activated as discussed previously.

In the variation where the second light source is activated, light from the second light source enters the bottom edge of the clear diffusion sheet 130 and homogeneous light is emitted from the clear diffusion sheet through a face of the clear diffusion sheet. Light emitted from the face of the diffusion sheet passes through slot 137 in second mask 135 and illuminates light pipe 140. As discussed previously, the second light source may be formed from light emitting elements of the same color or may be formed from light emitting elements of different colors. The control system discussed in FIG. 4 may be used to vary the characteristics of the second light source. For example, all the light emitting elements may be set to the same intensity or the intensity may vary along the length of the array. Further, all the light emitting elements may be set to the same color or the color may vary along the length of the array. The timing sequence of the light emitting elements may be varied such that the light emitted is steady, pulsed, oscillates, or varies along the length of the array. The optional third light source may also be activated as discussed previously.

Figure 5:
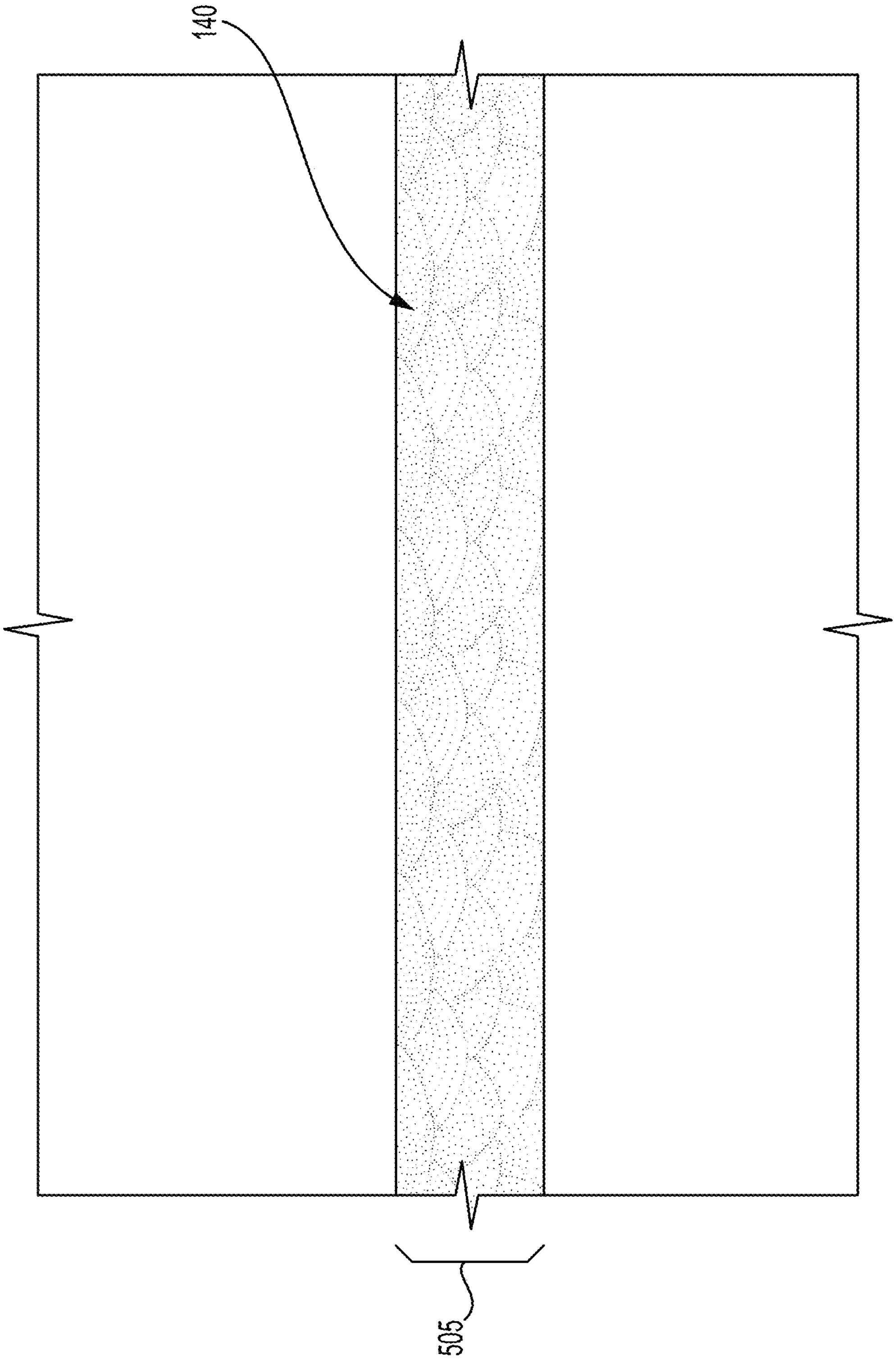
FIG. 5 shows an illustration of an illuminated light pipe exhibiting full width illumination.

FIG. 5 shows an illustration of an illuminated light pipe 140 exhibiting uniform illumination without integrated images. The illustration shown in FIG. 5 represents the outcome of activating the two light sources. The uniform illumination is represented by element 505 and fills the diameter of the light pipe 140.

Figure 6:
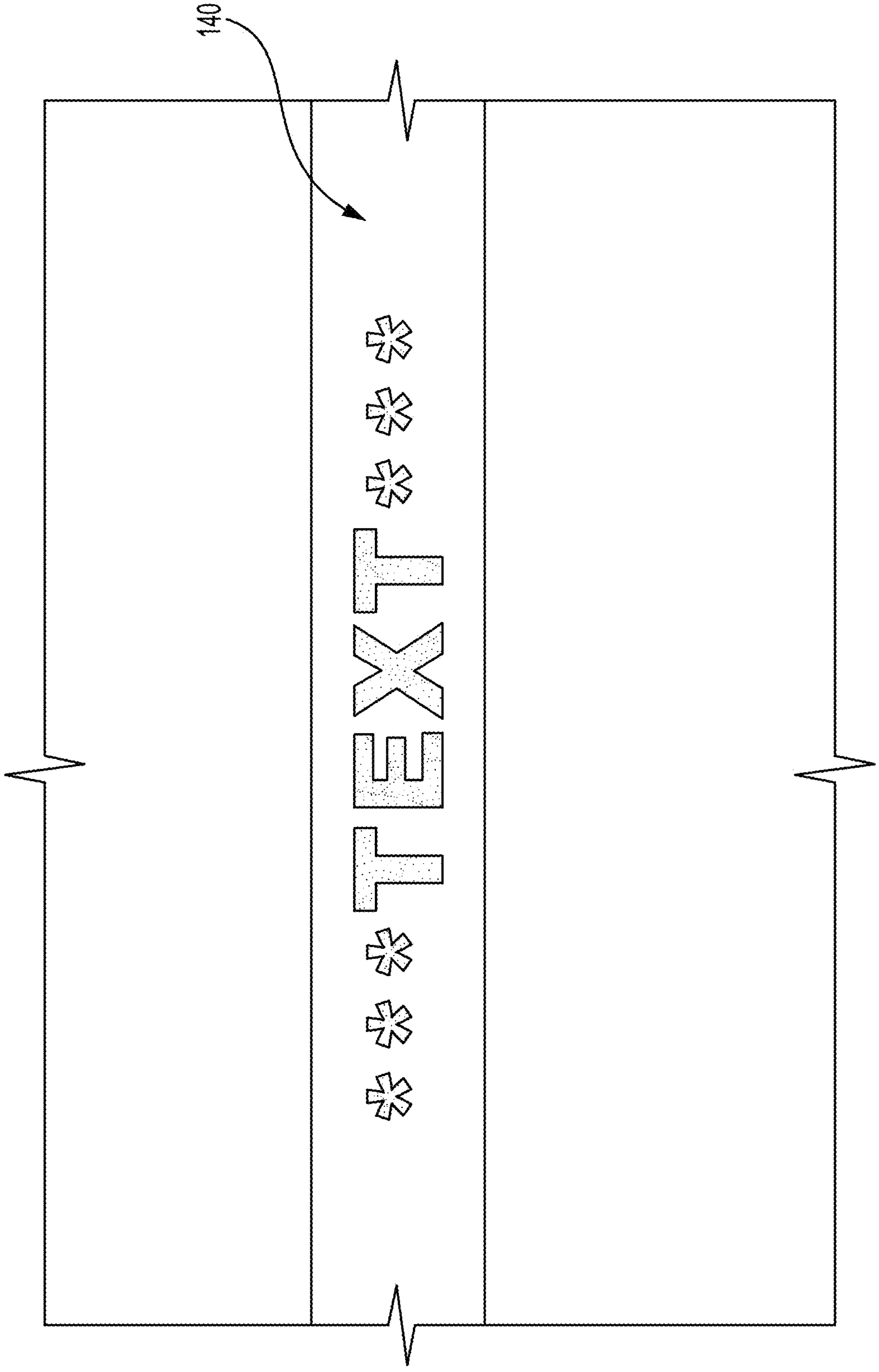
FIG. 6 shows an illustration of an illuminated light pipe exhibiting an integrated image.

FIG. 6 shows an illustration of an illuminated light pipe exhibiting illumination with integrated images. The illustration shown in FIG. 6 represents the outcome of activating only the first light source, thereby generating integrating images in light pipe 140. The example illustrated in FIG. 6 shows text as an example of the images. However, as discussed previously, the image may be any desirable pattern.

FIG. 7 shows a top view of second mask 135 with slot 137. As described above, slot 137 is aligned longitudinally and spans nearly the entire length of second mask 135.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

What is claimed is:

1. A multi-function light pipe apparatus, comprising:
- a first light source;
- at least one optical sheet positioned above the first light source;
- a first mask positioned above the at least one optical sheet;
- a clear diffusion sheet positioned above the first mask and aligned coplanar with the first mask;
- a second light source configured to illuminate an edge of the clear diffusion sheet such that the clear diffusion sheet is edge lit by the second light source;
- a second mask positioned above and coplanar with the clear diffusion sheet, wherein the second mask comprises a longitudinal slot for light to pass through; and
- a light pipe positioned above the second mask and aligned with the longitudinal slot such that light passing through the longitudinal slot impinges on at least a portion of the light pipe for projection from the light pipe.

2. The light pipe apparatus of claim 1, wherein the first light source comprises an array of light emitting elements.

3. The light pipe apparatus of claim 1, wherein the first mask comprises portions that substantially block light emitted from the at least one optical sheet, and the first mask comprises other portions that substantially permit emitted light to pass through for forming a pattern of emitted light.

4. The light pipe apparatus of claim 3, wherein the first mask comprises partially translucent portions that permit some but not all light to pass through.

5. The light pipe apparatus of claim 1, wherein the first mask comprises an opaqueness for substantially blocking light and a plurality of holes for forming a pattern, wherein the pattern of holes enables light to pass through.

6. The light pipe apparatus of claim 5, wherein the pattern of holes shapes a corresponding image of light projected from the light pipe.

7. The light pipe apparatus of claim 1, wherein the second mask comprises an opaqueness for substantially blocking light.

8. The light pipe apparatus of claim 1, wherein the longitudinal slot of the second mask comprises an opening that substantially spans a length of the clear diffusion sheet and the light pipe.

9. A method of projecting light from a light pipe apparatus, the method comprising:

emitting light from a first light source, wherein the light from the first light source passes through at least one optical sheet positioned above the first light source;

filtering light from the at least one optical sheet via a first mask positioned above the at least one optical sheet;

emitting light from a second light source, wherein the second light source is positioned to illuminate an edge of a clear diffusion sheet positioned above the first mask and aligned coplanar with the first mask, such that the clear diffusion sheet is edge lit by the second light source;

filtering light from the clear diffusion sheet via a second mask positioned above and coplanar with the clear diffusion sheet, wherein the second mask comprises a longitudinal slot for light to pass through; and projecting light from a light pipe positioned above the second mask and aligned with the longitudinal slot, wherein light passing through the longitudinal slot impinges on at least a portion of the light pipe.

10. The method of claim 9, comprising deactivating the second light source thereby emitting light only from the first light source such that a pattern of light emitted from the first mask is substantially projected via the light pipe.

11. The method of claim 9, wherein filtering light from the first mask comprises substantially blocking portions of light emitted from the at least one optical sheet, and substantially permitting other portions of emitted light to pass through, thereby forming a pattern of emitted light.

12. The method of claim 11, wherein filtering light from the first mask comprises permitting some but not all light to pass through partially translucent portions of the first mask.

13. The method of claim 11, wherein the first mask comprises a pattern of holes for forming the pattern of emitted light such that a corresponding image of light is projected from the light pipe.

14. The method of claim 9, wherein the second mask comprises an opaqueness for substantially blocking light such that light passes only through the longitudinal slot of the second mask.

15. The method of claim 9, wherein the longitudinal slot of the second mask comprises an opening that substantially spans a length of the light pipe such that light is substantially projected along the length of the light pipe.

* * * * *